July 23, 1968
F. A. ZIHERL ET AL
3,393,930
COUPLING FOR THIN-WALLED TUBES
Filed Aug. 18, 1966
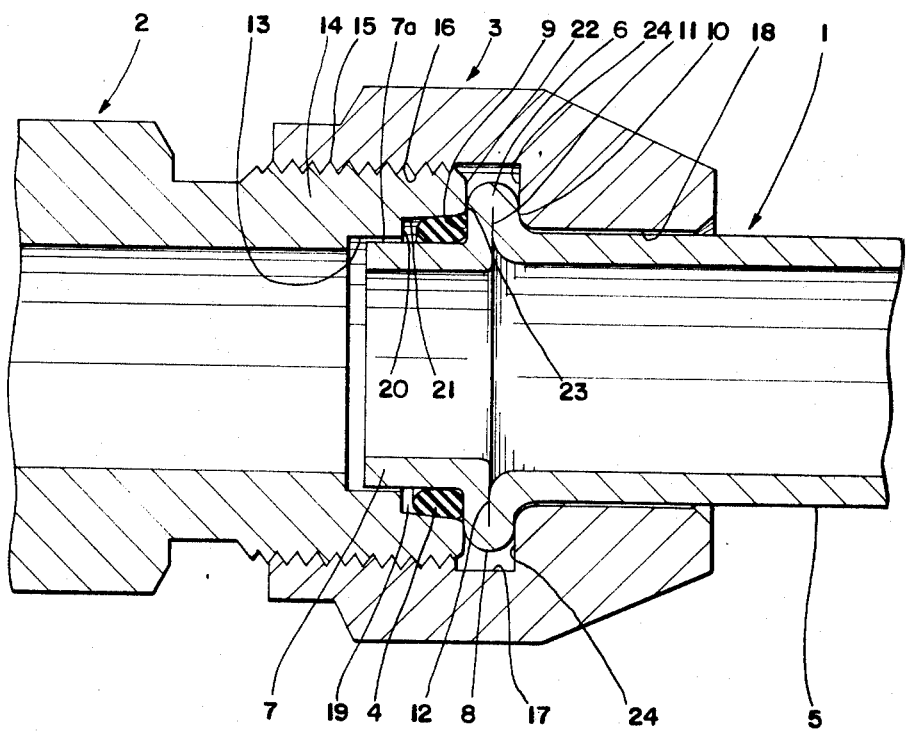
INVENTORS
FRANK A. ZIHERL
ARTHUR S. KISH
BY
*Isler & Ornstein*
ATTORNEYS

# United States Patent Office 3,393,930
Patented July 23, 1968

3,393,930
COUPLING FOR THIN-WALLED TUBES
Frank A. Ziherl, Richmond Heights, and Arthur S. Kish, Lyndhurst, Ohio, assignors to Parker-Hannifin Corporation, Cleveland, Ohio, a corporation of Ohio
Continuation-in-part of application Ser. No. 375,552, June 16, 1964. This application Aug. 18, 1966, Ser. No. 579,465
1 Claim. (Cl. 285—334.4)

ABSTRACT OF THE DISCLOSURE

The invention relates to an improvement in a coupling for coupling a thin-walled tube to a coupling member, wherein the tube has a bead provided with radial walls, the bead is clamped between the coupling members, and a sealing ring is disposed in a recess in one of the coupling members and is compressed between the tube and a wall of said recess, the improvement consisting in providing said coupling member with a wall adjacent said recess which wall has a line contact with one of said radial walls and is disposed at a slight angle outwardly from said radial wall, to thereby provide a clearance between the wall of the coupling member and said radial wall, so that tightening of the coupling cannot cause collapsing of the bead or the end portion of the tube.

---

This application is a continuation-in-part of our copending application, Ser. No. 375,552, filed June 16, 1964, now abandoned.

The invention relates generally to a coupling for thin-walled tubing, but has reference more particularly to improvements in the type of coupling disclosed, for example, in the MacWilliam Patent 3,092,404.

In MacWilliam Patent 3,092,404, there is disclosed a packed screw threaded gland type coupling for thin-walled tubing, wherein a bead on the tube makes a line contact with a shoulder on one member of the coupling which is at an obtuse angle to the axial wall of the recess which contains the packing, the packing being of the O-ring type.

In the MacWilliam patent, the aforesaid axial wall of the recess is stated to be at an angle of about 5° to the horizontal, so that if the angle between the aforesaid shoulder and the axial wall is, as stated, an obtuse angle, the shoulder will, in all circumstances, be inclined toward the bead in the manner illustrated in FIGS. 1 and 3 of the MacWilliam patent.

In FIG. 4 of the MacWilliam patent, this inclination of the shoulder 20 towards the bead is not clearly shown, but it must be assumed that since the disclosure in the specification is directed primarily to the fact that the shoulder 20 is at an obtuse angle to the axial wall of the recess 21, that the shoulder 20 must also be inclined toward the bead in a manner similar to that shown in FIG. 3. Any impression that this shoulder is inclined away from the bead must be considered as an optical illusion created by the lower portion of the lead line from reference numeral 20 in FIG. 3, and reference to the original India ink drawings in the MacWilliam patent application indicates that, at the most, the shoulder 20 appears to be a continuation of the line which represents the adjacent radial wall of the bead 16, so that since the axial wall of the recess 21 is at an angle of 5° to the horizontal, the wall of the shoulder 20 is at an angle of 95° to the axial wall of the recess 21. On this latter assumption, which is the most that can be assumed, the shoulder 20 in FIG. 3 of the MacWilliam patent lies flat against the adjacent radial wall of the bead, and cannot have a line contact with such wall of the bead.

We have found that in using a coupling as described in the aforesaid patent, for the coupling of thin-walled tubing of aluminum or other relatively soft and flexible metal, that when the coupling is tightened, and particularly when the tightening is excessive, there is a tendency, due to the pressure of the bead against the obtuse-angled shoulder or surface, to which reference has been made, for this surface to act to cam the bead radially inwardly toward the axis of the tubing, with the result that both the bead and the end portion of the tube which confines the O-ring seal are collapsed or pushed radially-inwardly, causing the recess in which the O-ring is confined to become enlarged, so that the effectiveness of the O-ring seal is destroyed or greatly reduced. This is also true, in somewhat lesser degree, even where, as in FIG. 4 of the MacWilliam patent, the shoulder 20 is at an angle of 95° to the axial wall of the recess 21, and the shoulder lies flat against the adjacent radial wall of the bead.

We have found that this tendency of the tubing to be collapsed and of the effectiveness of the O-ring seal to become destroyed or reduced, without, at the same time, losing the benefit of the metal to metal line contact or secondary seal between the bead and coupling, can be eliminated by redesigning one of the coupling members in a manner such that the shoulder or end wall on the coupling member is at an angle of 90° to the axial wall of the sealing ring recess, which latter is at an angle of 5° to the axis of the coupling member.

The invention is illustrated in the accompanying drawing, wherein the single figure shows a preferred embodiment of the invention.

Referring more particularly to the drawing, there is disclosed a tube connection or coupling comprising a thin-walled tube 1, a coupling member 2, which may, for example, be a valve, fitting, or the like, of which only a portion is shown, a second coupling member 3 adapted to be secured to the member 2, and a sealing ring or gasket 4, which may, for example, be of the O-ring type.

The tube 1 has a portion 5 of normal diameter, an external bead 6 adjacent the end thereof, and a cylindrical portion 7 of reduced diameter extending from the bead 6 to the free end of the tube. The bead 6 and the portion 7 of reduced diameter can be formed in any suitable manner, as, for example, by means of a die or other tool which forms an internal groove while constricting the end portion of the tube to reduce its diameter and then collapsing the walls forming the groove to provide a bead having an outer surface 8 of arcuate or circular cross-section, a radial wall 9 of one area at one side of the bead, and a radial wall 10 at the other side of the bead of an area less than that of the wall 9, the inner radial walls 11 and 12 of the bead being in contact with each other.

The sealing ring or gasket 4 which is disposed on the outer surface 7a of the end 7 of the tube may be an O-ring or a ring of any desired cross-section, and is made of a compressible material which is suitably dimensioned for the purposes to be described.

The coupling member 2 has a bore or opening 13, and is provided with an end portion 14 having male threads 15 adapted for engagement with the female threads 16 formed in a counterbore 17 of the bore 18 of the coupling member 3.

The bore or opening 13 of the coupling member 2 is counterbored to provide an internal annular recess 19 for the sealing ring 4, this recess being defined at one end by a substantially radially-extending wall 20, and by a substantially axial or conical wall 21 which intersects the wall 20 and extends outwardly at an angle of 5° to the axis of the coupling member 2. The wall 21 is thus disposed at an angle of 95° to the wall 20.

The coupling member 2 is provided at its end with an end wall 22 which extends at an angle of 90° to the wall 21 of the recess 19. Since the wall 21 is at an angle of 5° to such axis, and the end wall 22 is at an angle of 90° to the wall 21, it follows that the wall 22 will be disposed at an angle of 5° outwardly from the radial wall 9 of the bead 6, thus providing a clearance between the wall 22 and the wall 9.

Moreover, the intersection of the walls or surfaces 21 and 22 form a relatively sharp corner 23 which engages the radial wall 9 at a point slightly radially-inward of the radially-outermost edge of the wall 9 of the bead, so that a line contact is established between such corner 23 and the wall 9 when the coupling is assembled.

The portion 5 of the tube 1 extends through the bore 18 of the coupling member 3, the reduced portion 7 of the tube is received in the bore 13, and the sealing ring 4 is seated in the recess 19 to surround the tube portion 7, between the surfaces 7a and 21.

When the coupling members 2 and 3 are threadedly secured to each other, as seen in the drawing, a shoulder 24 formed on the coupling member 3 at the junction between the counterbore 17 and bore 18, engages the radial wall 10 of the bead, and the radial wall 9 of the bead engages the corner 23 of the member 2 to form a line contact between the corner 23 and the wall 9. This mechanical, line seal engagement is advantageous in that it reduces the wear and tear on the sealing ring 4 while in service and provides an excellent secondary seal for the coupling. At the same time, the sealing ring 4 is compressed radially and expanded axially within the recess 19 to provide the primary seal for the coupling.

Since the radial wall 9 of the bead does not engage the coupling 2 at a surface which could act to cam the bead radially inwardly toward the axis of the tube 1, and since the slight angle between the end wall 22 and the radial wall 9 of the bead provides a small clearance space between such end wall and radial wall, there is no wall-to-wall engagement between such end wall and radial wall. Consequently, when the coupling members are assembled and tightened to form the finished coupling, there is no tendency whatever for the coupling member 2 to cam the bead radially-inwardly towards the axis of the tubing, and thus there can be no collapsing of the bead or the end portion 7 of the tube, and therefore no enlargement of the recess 19 in which the sealing ring is confined.

To the contrary, the arrangement is such as to produce a reverse tendency, render assembly of the parts easier, and obtain a desired wedging action of the sealing ring.

The angle of 90° which the end wall 22 makes with the wall 21 is a fairly critical one, from which little or no appreciable deviation is permitted.

If this angle is increased appreciably beyond 90°, say to 94 or 95°, the wall 22 would present a flat surface, rather than a line contact, to the wall 9 of the bead, thereby precluding the formation of the line contact, and its attendant advanages, to which reference has been made hereinbefore. Moreover, there would be no clearance left between the walls 22 and 9, for the material of the radially outer portion of the bead to move into, a movement which is definitely effective to prevent or forestall the inward camming action which has been described.

If, on the other hand, this angle is decreased appreciably below 90°, say to 85 or 86°, the corner 23 becomes too sharp, so that if the tightening pressure of the nut 3 becomes excessive, this corner will cut into the wall 9 of the bead, and with the bead wall very thin, the bead could conceivably be sheared from the tube.

Although the drawing shows a coupling in which the female coupling member is in the general form of a nut, and the novel constructional features are embodied in the male coupling member, it will be understood that the male portion of the coupling may, as in FIGS. 1 and 3 of the aforesaid MacWilliam patent, be in the form of a nut, and the novel constructional features of the invention embodied in the female coupling member, which could be a valve, fitting or the like.

It is to be understood that the form of our invention, herewith shown and described, is to be taken as a preferred example of the same, and that various changes may be made in the shape, size and arrangement of parts thereof, without departing from the spirit of the invention or the subjoined claim.

Having thus described our invention, we claim:

1. In combination with means for coupling a thin-walled tube or uniform wall thickness to a coupling member, wherein the tube has a bead thereon having a first radial wall at one side of the bead and a second radial wall at the other side of the bead, the second radial wall being of lesser area than the first radial wall, the tube having an end portion adjacent said first radial wall of lesser external diameter than the external diameter of the tube adjacent said second radial wall, a first coupling member having a bore for receiving the end portion of the tube adjacent said first radial wall, said bore counterbored to provide a recess defined by a radially-extending wall and a conical wall at an angle of 5° to the axis of said first coupling member and at an obtuse angle to said radially-extending wall, a sealing ring mounted on said end portion of the tube and disposed in said recess, a second coupling member threadedly secured to the first coupling member and having a bore therein through which the portion of the tube of larger diameter passes, said second coupling member having a shoulder which bears against the radial wall of lesser area; the improvement wherein said first coupling member is provided with a wall adjacent said recess which wall is disposed at an angle of 90 degrees to the conical wall of the recess, whereby to provide a corner at the intersection thereof with said conical end wall which corner bears against and has a line contact with said first radial wall at a point slightly radially inward of the radially outermost edge of said first radial wall and which makes an angle of approximately 5 degrees outwardly from said first radial wall, a clearance being thus provided between said wall and said first radial wall, so that tightening of the coupling cannot cause collapsing of the bead or end portion of the tube.

References Cited

UNITED STATES PATENTS

| | | | |
|---|---|---|---|
| 1,484,295 | 2/1924 | Bundy | 285—382 X |
| 2,469,851 | 5/1949 | Stecher et al. | 285—104 |
| 2,522,195 | 9/1950 | Richardson | 285—382 X |
| 3,092,404 | 6/1963 | MacWilliam | 285—350 X |

EDWARD C. ALLEN, Primary Examiner.

THOMAS F. CALLAGHAN, Assistant Examiner.